Aug. 5, 1969     W. REED     3,459,159
LIQUID FEEDER
Filed May 5, 1967
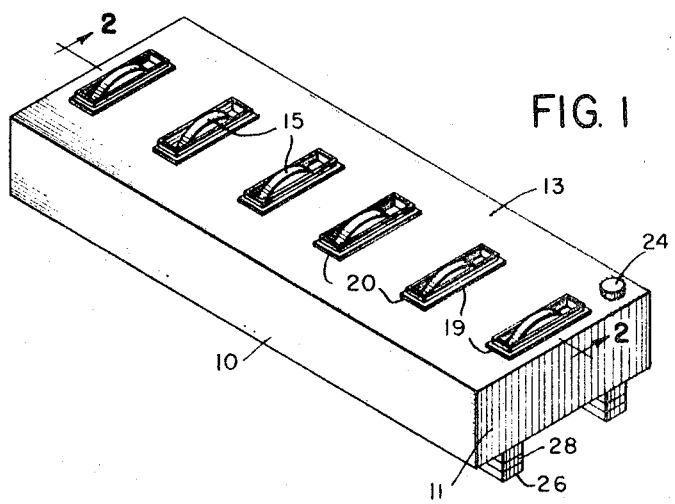
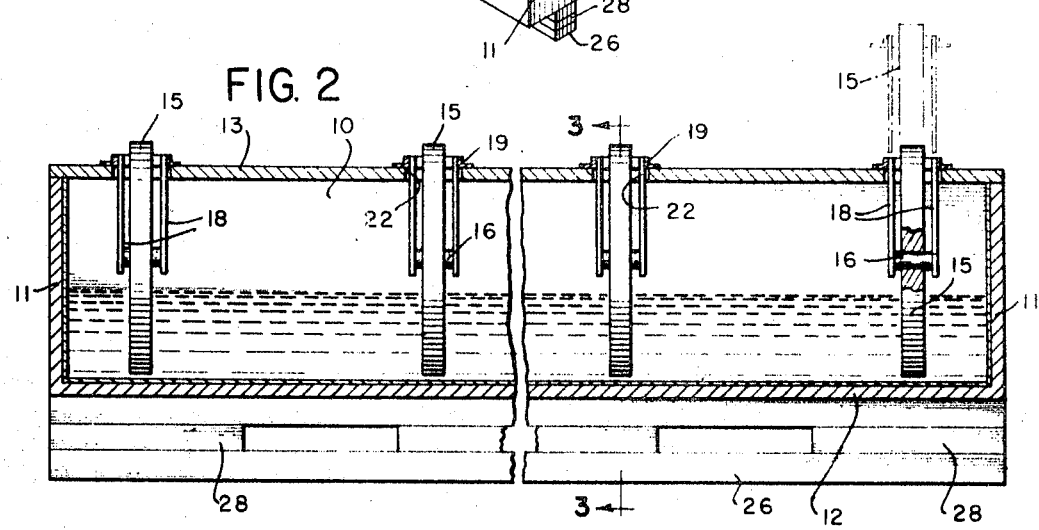
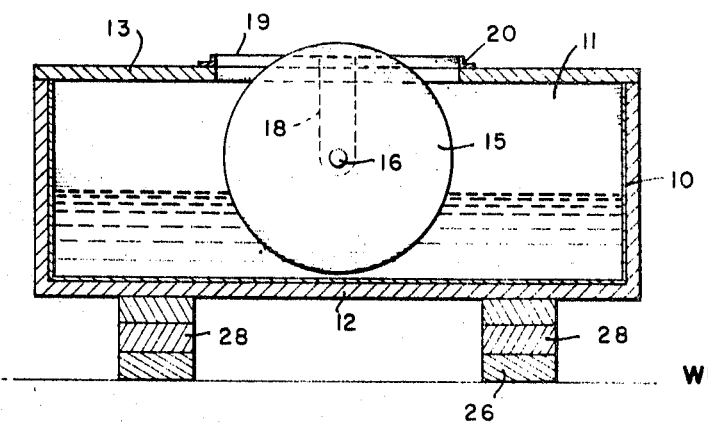
INVENTOR
WELDON REED 0# United States Patent Office 3,459,159
Patented Aug. 5, 1969

3,459,159
LIQUID FEEDER
Weldon Reed, 205 W. Manana,
Clovis, N. Mex. 88101
Filed May 5, 1967, Ser. No. 636,358
Int. Cl. A01k 7/00
U.S. Cl. 119—51                     1 Claim

ABSTRACT OF THE DISCLOSURE

A liquid feeder primarily for cattle includes a low-height, enclosed liquid container with one or more rotatable discs which dip into the feed and carry it to their upper periphery projecting through slots in the top of the container as cattle lick the discs to cause rotation.

---

This invention relates to animal sustenance and more particularly to the feeding of domestic animals such as cattle. Various feeds for cattle have been used, and these have included liquid feeds. However, the use of liquid feeds has been hindered by the lack of a relatively simple feeder which would permit the animals to obtain a proper amount and avoid overfeeding, prevent its contamination, and require a minimum of attention.

Various liquid feeding devices have been employed, including controlled dispensers of various kinds, but these have been relatively complicated and expensive and have required considerable attention in order for satisfactory operation to continue.

Accordingly, it is an object of the present invention to provide a device for holding and metering out a liquid feed and which is of relatively simple construction and requires a minimum of attention.

A further object is the provision of a liquid feeder in which the feed is protected from contamination and in which the animals can obtain an adequate supply at a controlled rate in order that proper feeding is accomplished without overfeeding.

A further object of the invention is the provision of a controlled liquid feeder for animals in which the rate of feeding is automatically proportioned to the activity of the animal, thereby automatically providing more active animals with a greater amount of feed.

These and other objects of the invention will be apparent from the following description taken in conjunction with the accompanying drawing wherein:

FIG. 1 is a perspective of a device in accordance with the present invention;

FIG. 2, an enlarged section on the line 2—2 of FIG. 1; and,

FIG. 3, a section on the line 3—3 of FIG. 2.

Briefly stated, the present invention includes a sturdy, enclosed liquid container having an upper surface from which the upper portions of one or more rotatable discs are exposed at a height which the animal can conveniently reach for feeding, the major portion of the disc mounted within the housing and extending into the liquid feed whereby the animal can rotate the disc to bring a fresh supply of feed continually onto the exposed portion and thereby feed itself.

With continued reference to the drawing, the feeder includes a container which may be substantially rectangular as indicated, having side walls 10, end walls 11, a bottom 12, and a top 13. The container may be made of conventional materials such as plywood with appropriate reinforcement, or from other well known materials such as fiberglass. It is important that the container be leakproof and adapted to withstand heavy usage.

The top 13 has protruding from its surface at spaced locations the tops of discs 15 which are mounted for rotation within the container.

In the illustrated embodiment, the discs are preferably of solid wood although other forms may be employed. The discs may be of an appropriate size for the purpose indicated, for example about 15" in diameter and about 1½"–2" thick. The discs are mounted coaxially or in substantially parallel planes in order that the animals may feed side by side and they extend in proximity to the bottom of the container in order that its full capacity may be used. The discs are spaced apart adequately to permit animals to feed side by side, a spacing of approximately 17" having been found suitable for cattle.

Each of the discs is rotatably mounted on a shaft or axle 16 which is carried between a pair of spaced hangers 18 each of which is connected to an angle iron member 19 across the top of the cover. Angle iron members 20 are connected across the ends of each pair of angle iron members 19. The angle iron members 19 and 20 are mounted on the upper surface of the cover adjacent to slot 22 through which the upper portion of disc 15 projects above the cover. This arrangement permits easy removal, inspection and replacement of each disc and its support as a unit. The arrangement of the angle iron members 19 and 20 also tends to prevent the animal from dripping liquid across the cover and thereby attract flies or insects. The top 13 may be removable in order that access to the interior may be had from time to time for inspection, cleaning and repairs as may be required.

At one corner a removable plug 24 is mounted in an aperture in order that the container may be filled from time to time.

The dimensions of the various parts may be selected in accordance with a particular situation. It has been found that a suitable container for feeding a substantial number of cattle may be approximately 8' long and 3' wide and approximately 13½" in height.

In order to position the tops of the discs at a height suitable for cattle, to keep it out of contact with the ground and to permit its being moved, the container is supported on skids 26 which are spaced from the bottom of the container by legs 28. Instead of skids other conventional support means might be used, such as wheels. In the embodiment disclosed, the tops of the disc are approximately 20¾" above the floor or ground on which the container is mounted.

When the containers are filled with liquid feed, the animals lick the exposed portions of the discs causing them to rotate and to bring more feed onto the exposed part. Any feed which is not consumed tends to drain back into the container and is not wasted. An active animal which normally eats at a faster rate than one that is sedentary can obtain feed at a faster rate, but the animal cannot get into the container and merely drink the feed. Since the containers are enclosed, the content is protected from rain, insects, dirt and other foreign matter.

It will be obvious to one skilled in the art that various changes may be made in the invention without departing from the spirit and scope thereof and therefore the invention is not limited by that which is illustrated in the drawing and described in the specification.

What is claimed is:

1. A liquid feeder comprising a container for liquid, said container having a top with slot means therein, disc means, each with an upper portion of its periphery extending upwardly through a slot means and the lower portion of its periphery positioned within the container, said disc means being rotatable in response to force applied against its exposed portion, said container mounted with its top at a height at which it might be reached by an animal, each of said disc means mounted on an axle, and hanger means carrying each axle, said hanger means having support means mounted on said top and adjacent to the sides of the slot means through which the disc means extends, the hanger means and the disc means carried thereby being removable from the container through the slot means.

References Cited
UNITED STATES PATENTS

| | | | |
|---|---|---|---|
| 1,747,597 | 2/1930 | Pheifer | 119—157 |
| 2,158,094 | 5/1939 | Teske | 119—51 |

HUGH R. CHAMBLEE, Primary Examiner